(12) United States Patent
Nishiura et al.

(10) Patent No.: US 10,297,817 B2
(45) Date of Patent: May 21, 2019

(54) NEGATIVE ELECTRODE FOR LITHIUM ION SECONDARY CELL, LITHIUM-ION SECONDARY CELL, MIXTURE PASTE FOR NEGATIVE ELECTRODE FOR LITHIUM-ION SECONDARY CELL, AND METHOD FOR MANUFACTURING NEGATIVE ELECTRODE FOR LITHIUM-ION SECONDARY CELL

(71) Applicants: MITSUI CHEMICALS, INC., Tokyo (JP); SHIN-ETSU CHEMICAL CO., LTD., Tokyo (JP)

(72) Inventors: Katsunori Nishiura, Chiba (JP); Masaki Saruyama, Neyagawa (JP); Yoshihiro Sakata, Ichikawa (JP); Hitoshi Onishi, Chiba (JP)

(73) Assignees: MITSUI CHEMICALS, INC., Tokyo (JP); SHIN-ETSU CHEMICAL CO., LTD., Tokyo (JP)

( * ) Notice: Subject to any disclaimer, the term of this patent is extended or adjusted under 35 U.S.C. 154(b) by 220 days.

(21) Appl. No.: 15/116,123

(22) PCT Filed: Feb. 2, 2015

(86) PCT No.: PCT/JP2015/000445
§ 371 (c)(1),
(2) Date: Aug. 2, 2016

(87) PCT Pub. No.: WO2015/118849
PCT Pub. Date: Aug. 13, 2015

(65) Prior Publication Data
US 2017/0077501 A1 Mar. 16, 2017

(30) Foreign Application Priority Data

Feb. 4, 2014 (JP) .................................. 2014-019093
Feb. 4, 2014 (JP) .................................. 2014-019094

(51) Int. Cl.
| | | |
|---|---|---|
| *H01M 4/36* | (2006.01) | |
| *H01M 4/134* | (2010.01) | |
| *H01M 4/38* | (2006.01) | |
| *H01M 4/62* | (2006.01) | |
| *H01M 10/0525* | (2010.01) | |
| *H01M 4/04* | (2006.01) | |
| *H01M 4/587* | (2010.01) | |
| *H01M 4/02* | (2006.01) | |

(52) U.S. Cl.
CPC ......... *H01M 4/366* (2013.01); *H01M 4/0404* (2013.01); *H01M 4/0471* (2013.01); *H01M 4/134* (2013.01); *H01M 4/386* (2013.01); *H01M 4/387* (2013.01); *H01M 4/587* (2013.01); *H01M 4/622* (2013.01); *H01M 4/625* (2013.01); *H01M 10/0525* (2013.01); *H01M 2004/027* (2013.01); *Y02T 10/7011* (2013.01)

(58) Field of Classification Search
CPC .. H01M 4/0404; H01M 4/0471; H01M 4/134; H01M 4/366; H01M 4/387; H01M 4/587; H01M 4/622; H01M 4/625
See application file for complete search history.

(56) References Cited

U.S. PATENT DOCUMENTS

| | | | |
|---|---|---|---|
| 2001/0033822 A1 | 10/2001 | Ishii et al. | |
| 2004/0124402 A1* | 7/2004 | Nanba ............... | C04B 35/62635 252/500 |
| 2005/0233213 A1 | 10/2005 | Lee et al. | |
| 2009/0023066 A1* | 1/2009 | Kojima ................. | H01G 11/42 429/221 |
| 2009/0133741 A1* | 5/2009 | Higuchi .............. | H01G 9/2031 136/252 |
| 2009/0239151 A1 | 9/2009 | Nakanishi et al. | |
| 2009/0246624 A1 | 10/2009 | Kojima et al. | |
| 2010/0255377 A1* | 10/2010 | Tsubata ................. | H01M 4/587 429/231.8 |
| 2012/0282531 A1* | 11/2012 | Hwang ............. | H01M 10/0567 429/337 |
| 2013/0052508 A1* | 2/2013 | Kim ..................... | H01M 4/483 429/126 |
| 2013/0136986 A1 | 5/2013 | Scoyer et al. | |
| 2013/0136988 A1 | 5/2013 | Tanaka et al. | |
| 2013/0260020 A1 | 10/2013 | Tomikawa et al. | |
| 2014/0234705 A1 | 8/2014 | Yayamoto et al. | |

FOREIGN PATENT DOCUMENTS

| | | |
|---|---|---|
| CN | 1645653 A | 7/2005 |
| CN | 101546829 A | 9/2009 |
| CN | 101567438 A | 10/2009 |
| JP | 2002-343341 | 11/2002 |
| JP | 2004-047404 A | 2/2004 |
| JP | 2004-220910 A | 8/2004 |
| JP | 2004-362789 A | 12/2004 |
| JP | 2005-310760 A | 4/2005 |
| JP | 2005-259697 A | 9/2005 |
| JP | 2010-009857 A | 1/2010 |

(Continued)

*Primary Examiner* — Anca Eoff
(74) *Attorney, Agent, or Firm* — Foley & Lardner LLP

(57) ABSTRACT

A negative electrode for a lithium-ion secondary cell, the negative electrode including a layered body of a collector and a negative electrode active material layer containing an alloy-based material (A) containing silicon or tin as a constituent element, a carbon coating (C) that covers the surface of the alloy-based material (A), carbon particles (B), and a binder (D), wherein the negative electrode for a lithium-ion secondary cell is characterized in that the total pore volume and average pore diameter of the carbon particles (B), as measured by nitrogen gas adsorption, satisfy the ranges of $1.0 \times 10^{-2}$ to $1.0 \times 10^{-1}$ cm$^3$/g and 20 to 50 nm, respectively. The negative electrode for a lithium-ion secondary cell, and a lithium-ion secondary cell in which such a negative electrode for a lithium-ion secondary cell is used, have a high capacity and excellent cycle characteristics.

14 Claims, No Drawings

(56) References Cited

FOREIGN PATENT DOCUMENTS

| JP | 2010-212228 A | 9/2010 |
|----|---|---|
| KR | 10-2009-0099487 | 9/2009 |
| KR | 10-2013-0096637 | 8/2013 |
| TW | 201206826 A | 2/2012 |
| WO | WO-2013/054500 A | 4/2013 |

* cited by examiner

NEGATIVE ELECTRODE FOR LITHIUM ION SECONDARY CELL, LITHIUM-ION SECONDARY CELL, MIXTURE PASTE FOR NEGATIVE ELECTRODE FOR LITHIUM-ION SECONDARY CELL, AND METHOD FOR MANUFACTURING NEGATIVE ELECTRODE FOR LITHIUM-ION SECONDARY CELL

TECHNICAL FIELD

The present invention relates to a negative electrode for a lithium-ion secondary cell, a lithium-ion secondary cell, a negative electrode mixture paste for a lithium-ion secondary cell, and a method for manufacturing a negative electrode for a lithium-ion secondary cell.

BACKGROUND ART

Non-aqueous secondary cells including a lithium-ion secondary cell have high energy density, high voltage and high capacity, and are therefore utilized widely as a power source of a variety of portable equipments. In recent years, such secondary cells are increasingly used for medium- and large-sized equipments including power tools such as electric tools, electric cars, and electric assist bicycles.

In particular, along with the spread of electronic devices such as portable phones and note-type personal computers in which reduction in size and increase in functions are in progress, there is a demand for an improvement in capacity of a secondary cell to be used for such devices. As a measure, an electrode active material showing high charge/discharge capacity has been studied and developed. In particular, as an ingredient for a negative electrode active material, a substance such as silicon and silicon oxide having large initial capacity is attracting attention as an alternative for a carbon material, such as graphite, which has been used in conventional non-aqueous secondary cell (see Patent Literatures 1 and 2).

As such a material, silicon oxide ($SiO_x$) is gathering attention. Since this compound exhibits large volume expansion and contraction accompanying a charge/discharge reaction, it is known to suffer from problems such as increase in irreversible capacity caused by gradual pulverization of particles during each charge/discharge cycle of the cell and a reaction between Si precipitated on the surface with a non-aqueous electrolyte. As a result, the cell may exhibits a so-called cycle performance reduction phenomenon in which the capacity is reduced by repeated charging and discharging. In order to suppress the cycle performance reduction, a variety of studies has been carried out. For example, use of a composite material of $SiO_x$ and a carbon material (Patent Literature 3), or use of graphite particles satisfying specific requirements as a carbon material (Patent Literature 4) has been proposed. However, the industry demands for further improvements in cell capacity (Ah) and charge/discharge capacity performances (cycle performances) upon repeated charging and discharging.

There is also a demand for an electrode active material which maintains a constant capacity even at a high charge/discharge rate (i.e., having a high load characteristic). In order to achieve the high load characteristic, the electrode active material needs to have high conductivity.

CITATION LIST

Patent Literature

PTL 1
Japanese Patent Application Laid-Open No. 2004-047404
PTL 2
Japanese Patent Application Laid-Open No. 2005-259697
PTL 3
Japanese Patent Application Laid-Open No. 2010-212228
PTL 4
Japanese Patent Application Laid-Open No. 2004-362789

SUMMARY OF INVENTION

Technical Problem

The present invention is made in view of the technical background as described above, and an object of the present invention is to provide a negative electrode for a lithium-ion secondary cell having high capacity, an improved cycle performance, and an improved load characteristic and a lithium-ion secondary cell using the same.

Means to Solve the Problem

The present inventors have conducted extensive studies to solve the above-mentioned problem and arrived at the present invention. The scope of the present invention is as follows:

[1] A negative electrode for a lithium-ion secondary cell, comprising a laminate of a negative electrode active material layer and a collector, the negative electrode active material layer containing an alloy-based material (A) which contains silicon or tin as a constituent element, a carbon coating (C) that covers a surface of the alloy-based material (A), carbon particles (B), and a binder (D), wherein
the carbon particles (B) have a total pore volume of $1.0 \times 10^{-2}$ to $1.0 \times 10^{-1}$ cm$^3$/g and an average pore diameter of 20 to 50 nm, both measured by nitrogen gas adsorption method.

[2] The negative electrode for a lithium-ion secondary cell according to [1], wherein a percentage of the carbon coating (C) is 3 to 20% by mass based on 100% by mass of a total of the alloy-based material (A) and the carbon coating (C) in the negative electrode active material layer.

[3] The negative electrode for a lithium-ion secondary cell according to [1] or [2], wherein the alloy-based material (A) is silicon oxide represented by $SiO_x$ (0.5≤x≤1.5).

[4] The negative electrode for a lithium-ion secondary cell according to any one of [1] to [3], wherein an average particle diameter $D_{50}$ (B) of the carbon particles (B) is 2.0 to 8.0 times greater than an average particle diameter $D_{50}$ (A) of the alloy-based material (A).

[5] The negative electrode for a lithium-ion secondary cell according to any one of [1] to [4], wherein a content percentage of the alloy-based material (A) is 10 to 60% by mass when a total of the alloy-based material (A) and the carbon particles (B) in the negative electrode active material layer is 100% by mass.

[6] The negative electrode for a lithium-ion secondary cell according to any one of [1] to [5], wherein in the carbon particles (B), flat graphite materials are aggregated or bonded.

[7] The negative electrode for a lithium-ion secondary cell according to any one of [1] to [6], wherein the binder (D) is polyimide or polyamideimide.

[8] The negative electrode for a lithium-ion secondary cell according to any one of [1] to [7], further comprising a conductive additive (C').

[9] The negative electrode for a lithium-ion secondary cell according to [8], wherein the conductive additive (C') contains carbon fiber having an aspect ratio of 10 to 1000.

[10] The negative electrode for a lithium-ion secondary cell according to [9], wherein the carbon fiber has a fiber diameter of 2 to 1000 nm.

[11] The negative electrode for a lithium-ion secondary cell according to [9] or [10], wherein the carbon fiber is vapor grown carbon fiber.

[12] A lithium-ion secondary cell including the negative electrode for a lithium-ion secondary cell according to any one of [1] to [11].

[13] A negative electrode mixture paste for a lithium-ion secondary cell, comprising an alloy-based material (A) containing silicon or tin as a constituent element, a carbon coating (C) that covers a surface of the alloy-based material (A), carbon particles (B), a binder material (D') and a solvent (E), wherein the carbon particles (B) have a total pore volume of $1.0 \times 10^{-2}$ to $1.0 \times 10^4$ cm$^3$/g and an average pore diameter of 20 to 50 nm, both measured by nitrogen gas adsorption method.

[14] The negative electrode mixture paste for a lithium-ion secondary cell according to [13], wherein the binder material (D') is at least one member selected from the group consisting of polyimides, polyimide precursors and polyamideimides, and the solvent (E) is N-methyl-2-pyrollidone or N,N-diethylacetamide.

[15] A method for manufacturing a negative electrode for lithium-ion secondary cell which comprises applying and drying a negative electrode mixture paste for a lithium-ion secondary cell on a collector, wherein the negative electrode mixture paste for a lithium-ion secondary cell contains an alloy-based material (A) containing silicon or tin as a constituent element, a carbon coating (C) that covers a surface of the alloy-based material (A), carbon particles (B), a binder material (D') and a solvent (E), and the carbon particles (B) have a total pore volume of $1.0 \times 10^{-2}$ to $1.0 \times 10^{-1}$ cm$^3$/g and an average pore diameter of 20 to 50 nm, both measured by nitrogen gas adsorption method.

Advantageous Effects of Invention

The lithium-ion secondary cell using the negative electrode for a lithium-ion secondary cell of the present invention has high capacity, and exhibits an excellent cycle performance and a load characteristic.

DESCRIPTION OF EMBODIMENTS

The negative electrode of the present invention for a lithium-ion secondary cell includes a laminate of a negative electrode active material layer and a collector; the negative electrode active material layer having an alloy-based material (A) containing silicon or tin as a constituent element, a carbon coating (C) that covers a surface of the alloy-based material (A), carbon particles (B), and a binder (D). The negative electrode active material layer is provided by applying and drying a negative electrode mixture paste which contains the alloy-based material (A) containing silicon or tin as a constituent element, the carbon coating (C) that covers the surface of the alloy-based material (A), the carbon particles (B), a binder material (D') and a solvent (E) on the collector. Hereinafter, an embodiment of the negative electrode of the present invention for a lithium-ion secondary cell will be described in the order of the negative electrode mixture paste, the negative electrode (negative electrode sheet), and finally, the lithium-ion secondary cell using the above-mentioned negative electrode.

According to the present invention, a negative electrode for a lithium-ion secondary cell having high capacity is provided. In the present invention, the high capacity means that initial discharge capacity (unit: mAh/g) is greater than 340 mAh/g which is an average initial discharge capacity of an existing carbon-based negative electrode. The initial discharge capacity is calculated from a mass of a negative electrode active material and a time taken to discharge to 2.3 V at a discharge rate of 0.05 C after charging the cell to 4.2 V at a charge rate of 0.05 C. Each of the above-mentioned charge rate and the discharge rate (C rates) is a value provided by dividing a current value (A) by capacity (Ah). Hereinafter, the charge rate and the discharge rate are also collectively referred to as charge/discharge rates. The charge/discharge rates when a cell having capacity of 1 Ah is charged or discharged at 0.05 A are represented as 0.05 C.

<Negative Electrode Mixture Paste>

A negative electrode mixture paste according to the present invention contains an alloy-based material (A) containing silicon or tin as a constituent element, a carbon coating (C) that covers a surface of the alloy-based material (A), carbon particles (B), a binder material (D') and a solvent (E). Hereinafter, each component will be described below in detail.

[1] Alloy-based Material (A) Containing Silicon or Tin as Constituent Element (Material Containing Silicon as Constituent Element)

Examples of the alloy-based material which contains silicon as a constituent element for the negative electrode active material according to the present invention include (i) silicon microparticles, (ii) an alloy of silicon and tin, nickel, copper, iron, cobalt, manganese, zinc, indium, silver, titanium, germanium, bismuth, antimony or chromium, (iii) a compound of silicon and boron, nitrogen, oxygen or carbon, and (iv) a mixture containing the compound of silicon and boron, nitrogen, oxygen or carbon with the metal listed in (ii). Examples of the alloy or the compound containing silicon as a constituent element include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_x$ ($0.2 \leq x \leq 1.5$) and $LiSiO$.

(Material Containing Tin as Constituent Element)

Examples of the alloy-based material including tin as a constituent element for the negative electrode active material according to the present invention include (i) an alloy of tin and silicon, nickel, copper, iron, cobalt, manganese, zinc, indium, silver, titanium, germanium, bismuth, antimony or chromium, (ii) a compound of tin and oxygen or carbon, and (iii) a mixture of the compound of tin and oxygen or carbon, and the metal listed in (i). Examples of the alloy or the compound including tin as a constituent element include $SnO_w$ ($0<w \leq 2$), $SnSiO_3$, $LiSnO$ and $Mg_2Sn$.

The alloy-based material containing at least one of silicon and tin as a constituent element may be silicon or tin as a simple substance, an alloy thereof or a compound thereof, or a combination of two or more of the simple substance, the alloy or the compound, or the material may include a phase of one or more of the simple substance, the alloy or the compound as at least a part thereof. Note that "simple substance" means only a simple substance in general terms (i.e., may include a minor amount of impurities) and does not necessarily refer to a purity of 100%. A surface of the active material may be coated with a carbon material by a CVD method, etc.

Preferably, the alloy-based material (A) containing silicon or tin as a constituent element is silicon oxide represented by $SiO_w$ (0.5≤x≤1.5). In the present invention, $SiO_x$ (0.5≤x≤1.5) is a general formula representing a collective term for amorphous silicon oxides generally obtained using silicon dioxide ($SiO_2$) and a metal silicon (Si) as raw materials. In $SiO_x$ (0.5≤x≤1.5), when x is less than 0.5, ratio of the Si phase becomes high and a change in volume during charging and discharging becomes too large, thereby lowering the cycle performance of a lithium-ion secondary cell. When x exceeds 1.5, the ratio of the Si phase becomes low and the energy density becomes lowered. More preferably, the range of x is 0.7≤x≤1.2.

In general, $SiO_x$ with small particle diameter $D_{50}$ is preferred, but when the $D_{50}$ is too small, the particles may be aggregated and coarsened during the formation of the negative electrode. The $D_{50}$ refers to a particle diameter where an integrated value of a volume distribution in a particle diameter distribution measurement by a laser diffraction method corresponds to 50%. In other words, $D_{50}$ refers to a median diameter measured in volume basis. Typically, the $D_{50}$ of $SiO_x$ is within 1 μm to 15 μm, more preferably 2 μm to 8 μm. As described later, in the present invention, it is preferable that the $D_{50}$ of $SiO_x$ satisfies a specific relationship with $D_{50}$ of specific carbon particles (B) used simultaneously for preparing the negative electrode mixture paste. For $SiO_x$ (0.5≤x≤1.5), commercially available $SiO_x$ having a desirable $D_{50}$ may be used.

Amount of the alloy-based material (A) in the negative electrode mixture paste according to the present invention is 10% by mass to 60% by mass, preferably 25% by mass to 50% by mass, more preferably 31% by mass to 50% mass based on 100% by mass of the total of the alloy-based material (A) which is the negative electrode active material and the carbon particles (B). The lithium-ion secondary cell using the above-mentioned specific blend of the negative electrode active material is advantageous for preventing the capacity degradation caused by the volume change of the active material than the lithium-ion secondary cell using silicon oxide alone as the negative electrode active material. Thus, a cycle life of the lithium-ion secondary cell can be prolonged.

[2] Carbon Coating (C) that Covers Surface of Alloy-based Material (A)

The negative electrode mixture paste according to the present invention includes the carbon coating (C) that covers a surface of the alloy-based material (A) containing silicon or tin as a constituent element. By coating with the carbon coating (C), a conductive network in a negative electrode mixture paste mixture layer including the negative electrode active material can be formed successfully and a load characteristic of the cell can be improved. The surface of the alloy-based material (A) may be coated with the carbon coating (C) by a thermal CVD treatment method at a temperature of 800° C. or more and 1300° C. or less in an atmosphere of an organic substance and/or steam. By the thermal CVD treatment method, the carbon coating (C) may be formed so that the percentage of the carbon coating (C) is typically 3 to 20% by mass, preferably 3 to 15% by mass, more preferably 4 to 10% by mass. When the percentage of the carbon coating is 20% by mass or less, the relative content of the alloy-based material (A) in the negative electrode mixture paste becomes high and it becomes possible to maintain high capacity. When the percentage of the carbon coating is 3% by mass or more, the alloy-based material (A) has electron conductivity sufficient for achieving sufficient cell capacity. The time for the thermal CVD treatment is appropriately selected in view of the relationship with the amount of the carbon coating. When the alloy-based material (A) to be coated includes silicon oxide, silicon oxide is changed (disproportionated) into an silicon-silicon oxide-based composite by the action of heat during the treatment.

Specifically, the alloy-based material (A) in a powdered form is coated with carbon by heating at a temperature of 600° C. or more and 1300° C. or less, preferably 700° C. or more, more preferably 800° C. or more, particularly preferably 900° C. to 1200° C. in an atmosphere containing a hydrocarbon gas under a flow of inert gas in a reactor heated at 800° C. to 1300° C. In general, higher treatment temperature enables the formation of the carbon coating (C) having less residual impurities and containing carbons having high conductivity.

According to the present invention, any hydrocarbon-based gas that can be thermally decomposed at the heat treatment temperature to produce carbon (graphite) especially under a non-oxidizing atmosphere is suitably selected. Examples of such hydrocarbon-based gas include hydrocarbons such as methane, ethane, ethylene, acetylene, propane, butane, butene, pentane, isobutane, hexane and cyclohexane; and aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene and phenanthrene.

There is no particular limitation as long as the apparatus for the thermal CVD treatment is a reaction apparatus having a mechanism for heating a material to be treated in a non-oxidizing atmosphere. For example, an apparatus capable of treatment in a continuous manner or a batchwise manner can be used, and particularly the apparatus can be appropriately selected from a fluidized bed reaction furnace, a rotation furnace, a vertical moving bed reaction furnace, a tunnel furnace, a batch furnace, a rotary kiln and the like depending on its purpose.

[3] Carbon Particles (B)

The carbon particles (B), one of constituent substances of the negative electrode mixture paste according to the present invention, contains a graphite material. The carbon particles (B) may be graphite particles, particles composed of graphite particles and carbonaceous layers formed on the surfaces thereof (i.e., carbon coated graphite particles), or particles obtained by attaching carbon fibers to the carbon coated graphite particles or the graphite particles. Preferably, graphite particles are used.

Generally, the carbon particles (B) simultaneously satisfy the total pore volume range of $1.0 \times 10^{-2}$ to $1.0 \times 10^{-1}$ cm³/g and the average pore diameter range of 20 to 50 nm, both measured by nitrogen gas adsorption method. Preferably, the carbon particles (B) simultaneously satisfy the total pore volume range and the average pore diameter range of $1.5 \times 10^{-2}$ to $9.0 \times 10^{-2}$ cm³/g and 25 to 40 nm, respectively, and $2.0 \times 10^{-2}$ to $7.0 \times 10^{-2}$ cm³/g and 25 to 35 nm, respectively. When the total pore volume (v) and the average pore diameter (d) of the carbon particles (B) satisfy the above-mentioned ranges, an electrolyte is easily permeated into the active material, and maintain good ion conductivity. As a result, electrode resistance becomes reduced and the charge/discharge capacity and the load characteristic becomes improved. Since the carbon particles (B) have pores, when the alloy-based material (A) suffers volume expansion upon charging, the carbon particles (B) absorb the amount of the volume expansion of the alloy-based material (A) by elastic deformation therein and prevents the expansion of the electrode. Accordingly, increase in resistance caused by a peeling between the active material and the binder (D) due to the volume change of the alloy-based material (A) becomes suppressed, and the cell exhibits a good cycle performance.

The carbon particles (B) are preferably a secondary aggregate where primary particles including the graphite material are aggregated or bonded. With respect to the shapes of the primary carbon particles (B), flat particles are desired. When flat carbon particles are used, good conductivity is maintained even after the charge/discharge cycle. Therefore, it becomes possible to prevent the increase in the electrode resistance, and prolong the cycle life of the lithium-ion secondary cell. Examples of the flat primary carbon particles (B) include MAG™.

In the present invention, it becomes possible to reduce the volume change of the negative electrode as a whole by blending a predetermined amount of the carbon particles (B) with the alloy-based material (A) containing silicon or tin as a constituent element and adjusting the size ratio of these substances to a specific value. In other words, in the present invention, an average particle diameter $D_{50}$ (B) of the carbon particles (B) is preferably 2.0 to 8.0 times greater than, more preferably 2.2 to 6.5 times greater than, particularly preferably more than 2.5 to less than 6.0 times greater than an average particle diameter $D_{50}$ (A) of the alloy-based material (A).

When the average particle diameter $D_{50}$ (B) of the carbon particles (B) is at least 2.0 times greater than the average particle diameter $D_{50}$ (A) of the alloy-based material (A), there is a reduction in the volume change of the active material accompanying the charge/discharge cycle, and a decrease in the capacity caused by a conduction failure of a part of the electrode becomes less likely to occur. On the other hand, when the average particle diameter $D_{50}$ (B) is not more than 8.0 times greater than the average particle diameter $D_{50}$ (A) of the alloy-based material (A), a specific surface area of the active material is not too large to invite a reduction of the capacity due to a decomposition reaction of the electrolyte.

The amount of the carbon particles (B) in the negative electrode mixture paste according to the present invention is 40% by mass to 90% by mass, preferably 50% by mass to 75% by mass, more preferably 50% by mass to 69% by mass based on 100% by mass of the total of $SiO_x$ which is the negative electrode active material and the carbon particles (B). As compared with the lithium-ion secondary cell using only $SiO_x$ ($0.5 \leq x \leq 1.5$) as the negative electrode active material, the lithium-ion secondary cell using the above-mentioned negative electrode active material in the above-mentioned amounts can reduce the volume change of the negative electrode mixture layer and, therefore, it becomes possible to suppress the increase of resistance caused by peeling between the active material and the binder (D), and obtain a lithium-ion secondary cell having a good cycle performance.

[4] Conductive Additive (C')

The negative electrode mixture paste according to the present invention may contain a conductive material as a conductive additive (C'). The conductive material is not especially limited as long as it causes no chemical reaction in a non-aqueous secondary cell. Materials such as carbon black (thermal black, furnace black, channel black, ketchen black, acetylene black, etc.), carbon fiber, metal powder (powder of copper, nickel, aluminum, silver etc.), metal fiber and a polyphenylene derivative can be used. Among them, carbon fiber is preferred.

Preferably, the conductive additive (C') contains carbon fiber having an aspect ratio of 10 to 1000, preferably 10 to 500.

By combining the carbon particles (B) with the conductive additive (C') in a fibrous form having a preferred aspect ratio, the properties (capacity and cycle life) of the lithium-ion cell can be synergistically improved. The reason for such improvement is considered to be as as follows. The fibrous conductive additive (C') having the preferred aspect ratio is strong against pressure deformation and exhibits good electrolyte retention even when physical density of the electrode is increased, e.g., by pressing. On the other hand, as described above, the carbon particles (B) used in the present invention has a large total pore volume and the presence thereof enables easy permeation of the electrolyte into the active material, thereby enabling maintenance of good ion conductivity. Here, when the alloy-based material (A) suffers volume expansion upon charging, the carbon particles (B) absorb the amount of the volume expansion of the alloy-based material (A) by elastic deformation therein and prevents the expansion of the electrode. During such a phenomenon, the pore volume of the carbon particles (B) becomes reduced by the elastic deformation, and the lowering of the electrolyte retention is expected. Lowering of the electrolyte retention results in lowering of the ion conductivity, and causes not only the lowering of the capacity and the load characteristic, but also degradation of the active material due to nonuniform utilization of the active material. By blending the conductive additive (C') in the above-described form into the negative electrode, the conductive additive (C') exhibits relatively good electrolyte retention even when there is an increase in physical density of the electrode. Accordingly, good ion conductivity is maintained during the charging and discharging, and an increase of resistance in the electrode becomes prevented.

As to the conductive additive (C') in the above-described form, repetitive volume change of the alloy-based material (A) causes decrease in the amount of contact among the conductive additive (C') particles and results in increased electrode resistance accompanying the increase in the number of cycles, and reduction of an effective amount of the active material by conduction blockage. However, combined use of the active material, such as the carbon particles (B) in the above form, that can inhibit the expansion of the electrode will enable a reduction of and electrode resistance increase and a decrease in the amount of effective active material.

In summary, the combined use of the carbon particles (B) in the above form and the conductive additive (C') enables a decrease of both the resistance increase caused by the lowering of the electrolyte retention during charging and the conduction failure caused by the volume expansion of the alloy-based material (A) during charging. It is therefore conceivable that the combination of the specific carbon particles (B) and the conductive additive (C') enables a lithium-ion secondary cell to have high capacity and a prolonged cycle life.

A method of producing carbon fiber used as the conductive additive (C') in the present invention is not especially limited. For example, there are a method of spinning polymer into fiber and heating under an inert atmosphere; and a vapor phase growth method where an organic compound is reacted at high temperature in the presence of a catalyst. In the carbon fiber obtained by the vapor growth method, the so-called vapor grown carbon fiber, a growth direction of the crystal is roughly in parallel with the fiber axis and, therefore, crystallinity of a graphite structure is likely to become high in a fiber axis direction and there is obtained a carbon fiber having a relatively short fiber diameter, relatively high conductivity, and a relatively high strength.

In the present invention, a content of the conductive additive (C') is generally 0.5 to 10% by mass, preferably 1 to 8% by mass, more preferably 2 to 5% by mass based on a total mass of the alloy-based material (A) and the carbon particles (B) used as the negative electrode active material. In the electrode, the content of the conductive additive (C') is generally in the range of 0.05 to 20% by mass, preferably 0.1 to 15% by mass, more preferably 0.5 to 10% by mass based on a total mass of the electrode. When the content of the conductive additive (C') is not more than 10% by mass, the ratio of the active material in the electrode will be sufficient, and the capacity of the lithium-ion cell will be sufficient. When the content of the conductive additive (C') is at least 0.5% by mass, the effect of the conductive additive (C') to enable the electrolyte permeation into the electrode becomes satisfactory. The content of the conductive additive (C') can be adjusted during the preparation of the mixture paste by adding each component in an amount that will to fall within the above-mentioned range.

The aspect ratio can be calculated, for example, by dividing a fiber length by the fiber diameter both determined by an SEM image analysis. The preferred range of the fiber diameter depends on a type and fiber length of carbon fiber used, and it is 2 to 1000 nm, more preferably 2 to 500 nm. Examples of the conductive additive (C') having the preferred fiber diameter include vapor grown carbon fiber (VGCF) and carbon nanotube (CNT). The conductive additive (C') may be used alone or in combination.

As the conductive additive (C') used in the present invention, a conductive additive (C'-1) which satisfies the above-mentioned aspect ratio may be used in combination with a conductive additive (C'-2) which do not satisfy the aspect ratio. A typical example of the conductive additive (C'-2) not satisfying the aspect ratio is a carbon material. In the present invention, the conductive additive (C'-2) is preferably a conductive carbon material. The type of the conductive carbon material is not especially limited, and the conductive carbon material may be graphites, such as a man-made graphite and a natural graphite, and a thermolysis product of an organic substance prepared under variety of thermolysis conditions.

Examples of the organic thermolysis product which may be used as the conductive additive (C'-2) include coal coke; petroleum coke; carbide of coal pitch; carbide of petroleum pitch; carbide of the pitch oxidized; needle coke; pitch coke; carbide of phenol resin, crystal cellulose etc.; a carbon material partly graphitized; furnace black; acetylene black; pitch carbon fiber; and the like. Among these, graphite is preferred. In particular, preferred is a man-made graphite produced by subjecting easily graphitizable pitch from various raw materials to a high temperature treatment, purified natural graphite, or a graphite subjected to a variety of surface treatments.

When the conductive additive (C'-2) is used in combination, its amount is generally less than 100%, preferably less than 50% of the conductive additive (C'-1).

[5] Material for Binder (D') and Solvent (E)

The binder material (D') is used as a binding agent for fixing the negative electrode active material consisting of the alloy-based material (A) and the carbon particles (B) and the conductive additive (C') to the collector. The amount of the binder material (D') used is preferably 0.5 to 50% by mass based on a total amount of the alloy-based material (A), the carbon particles (B), the conductive additive (C') and the binder material (D'). When the binder material (D') is used in an amount of 0.5% by mass or more, formability of the electrode becomes increased, and when the binder material (D') is used in an amount of 50% by mass or less, energy density of the electrode becomes satisfactory. Examples of the binder material (D') include fluoropolymers such as polyvinylidene fluoride (PVDF) and polytetrafluoroethylene (PTFE), rubber such as styrene butadiene rubber (SBR), imide polymers such as polyimides, polyimide precursors and polyamideimides, and alcoxysilyl group containing resins. Among them, polyimide, a polyimide precursor and polyamideimide which have excellent binding properties are preferred.

In the present invention, the solvent (E) used in the preparation of the mixture paste is not especially limited as long as the solvent (E) is capable of uniformly dissolving or dispersing the binder material (D'), the active material and other materials optionally contained therein. The solvent (E) is preferably a polar aprotic solvent such as N,N-dimethylformamide, N,N-dimethylacetamide, N,N-diethylacetamide, N-methyl-2-pyrollidone, and 1,3-dimethyl-2-imidazolidinone. The solvent may be used alone or in combination. In particular, when polyimide, a polyimide precursor or polyamideimide is used as the binder material (D'), N-methyl-2-pyrollidone or N,N-diethylacetamide is preferably used. An amount of the solvent is set as appropriate taking viscosity, etc. of the mixture paste into consideration. Preferably, 50 to 900 parts by mass, more preferably 65 to 500 parts by mass of the solvent is added based on 100 parts by mass of a solid content of the mixture paste.

[6] Preparation Method of Negative Electrode Mixture Paste

The negative electrode mixture paste for a lithium-ion secondary cell can be produced by mixing, and agitating or kneading the binder material (D') for a lithium-ion secondary cell or a varnish containing the same, the alloy-based material (A) which is the negative electrode active material and the carbon particles (B), optionally with the carbon coating (C), the conductive additive (C'), the solvent (E), and other variety of additives as necessary. The following two methods are mentioned as methods for mixing the raw materials, but the present invention is not limited to these methods.

i) A conductive additive (C') is added to and kneaded with a varnish containing a binder material for a lithium-ion secondary cell binder (D'). An e active material and the solvent are added to the resultant kneaded product, thereby providing the negative electrode mixture paste.

ii) A conductive additive (C') is added to a varnish containing a material for a lithium-ion secondary cell binder (D'), and an active material is added thereto, followed by kneading of the thus obtained mixture. A solvent is added to the resultant kneaded product, thereby providing a negative electrode mixture paste.

The agitation may be a normal agitation using an impeller, etc., or an agitation using a planetary centrifugal mixer. The kneading operation may be carried out by using a kneader, etc.

<Negative Electrode (Negative Electrode Sheet)>

The negative electrode for a lithium-ion secondary cell is a laminate of a collector and a negative electrode active material layer. The negative electrode for a lithium-ion secondary cell may be a sheet electrode.

[1] Negative Electrode Active Material Layer

The negative electrode active material layer is the aforementioned negative electrode mixture paste for a lithium-ion secondary cell in a cured form. In other words, the negative electrode active material layer contains the alloy-based material (A) which is a negative electrode active material, the carbon particles (B), and the binder (D) for binding he alloy-based material (A) and the carbon particles (B), and optional other components (such as the conductive additive (C')). The binder (D) is composed of a dried and cured binder material (D') in the negative electrode mixture paste. Preferably, the binder (D) is polyimide or polyamideimide obtained by heating the binder material (D') selected from polyimide, a polyimide precursor and polyamideimide. Note that a quantity ratio of each of the alloy-based material (A), the carbon coating (C), the carbon particles (B) and other components (such as the conductive additive (C')) in the negative electrode active material layer is substantially the same as the quantity ratio of each components in the negative electrode mixture paste.

The thickness of the negative electrode active material layer is not especially limited, and is preferably 5 μm or more, more preferably 10 μm or more. Also, the thickness is preferably 200 μm or less, more preferably 100 μm or less, further preferably 75 μm or less. When the negative electrode active material layer is too thin, the electrode is not suitable for practical use in view of the balance between the thickness of the negative electrode active material layer and the particle diameter of the active material. On the other hand, when the negative electrode active material layer is too thick, absorption and desorption function of Li may become unsatisfactory upon charging and discharging at a high charge/discharge rate.

The density of the negative electrode active material layer is preferably 1.1 g/cm$^3$ to 1.6 g/cm$^3$, more preferably 1.2 g/cm$^3$ to 1.5 g/cm$^3$, further preferably 1.2 g/cm$^3$ to 1.4 g/cm$^3$. When the density of the negative electrode active material layer is less than 1.1 g/cm$^3$, volume energy density of the electrode becomes low, and when the density is greater than 1.6 g/cm$^3$, the cycle performance becomes low.

[2] Collector

The material of the collector in the negative electrode is a metal material such as silicon and/or an silicon alloy, tin and its alloy, a silicon-copper alloy, copper, nickel, stainless steel, nickel-plated steel; or a carbon material such as carbon cloth and carbon paper.

When the collector of the negative electrode is made of a metal material, the collector may be in the form of a metal foil, a metal column, a metal coil, a metal plate or a metal thin film. When the collector of the negative electrode is made of a carbon material, the collector may be in the form of a carbon plate, a carbon thin film or a carbon column. The thickness of the collector is not especially limited, and is generally 5 μm to 30 μm, preferably 6 to 20 μm. In addition, the surface of the collector may be roughened by a chemical treatment or a physical treatment, or coated with a conductive material such as carbon black and acetylene black.

[3] Method for Manufacturing Negative Electrode (Sheet) for Lithium-ion Secondary Cell The negative electrode (sheet) is provided by applying the aforementioned negative electrode mixture paste to the collector, followed by drying. Drying of the negative electrode mixture paste results in the removal of the solvent (E), and adhesion and curing of the binder material (D') to the collector, thereby forming a laminate of the negative electrode active material layer and the collector. The negative electrode mixture paste may be applied by screen printing, roll coating, slit coating or the like. An active material layer in a mesh form may be formed by applying the negative electrode mixture paste in a pattern.

Drying of the applied negative electrode mixture paste may be carried out by heat curing. In general, heat curing may be carried out under atmospheric pressure, but may be carried out under pressure or under vacuum. The atmosphere for heat drying is not especially limited, but generally, air, nitrogen, helium, neon or argon is preferred, and nitrogen or argon which is an inert gas is more preferred. The negative electrode mixture paste is heat cured generally at 150° C. to 500° C. for 1 minute to 24 hours. When polyimide, a polyimide precursor or polyimideamide is used as the binder material (D'), the mixture paste is heat cured preferably at 200° C. to 350° C. for 1 minute to 20 hours in order to obtain a reliable negative electrode.

<Llithium-ion Secondary Cell>

A basic constitution of the lithium-ion secondary cell of the present invention is similar to that of a conventional lithium-ion secondary cell. A general lithium-ion secondary cell has a pair of electrodes (negative electrode and positive electrode) capable of absorption and desorption of lithium ions, a separator and an electrolyte.

[1] Negative Electrode

The negative electrode in the lithium-ion secondary cell of the present invention is as described above.

[2] Positive Electrode

The positive electrode may be a laminate of a collector and a positive electrode active material layer. A material for the collector in the positive electrode is generally a metal material such as aluminum, stainless steel, nickel plating, titanium or tantalum; or a carbon material such as carbon cloth and carbon paper. Among these, the metal material is preferred, and aluminum is especially preferred. When the collector is made of a metal, the collector may be in the form of a metal foil, a metal column, a metal coil, a metal plate, a metal thin film, an expand metal, a punch metal or a foamed metal, and when the collector is made of a carbon material, the collector may be in the form of a carbon plate, a carbon thin film or a carbon column. Among these, the metal thin film is preferred because it is currently used in industrial products. The thin film may be in a mesh form, as appropriate.

When the positive collector is a thin film, the thickness thereof may be selected arbitrarily, but it is generally 1 μm or more, preferably 3 μm or more, more preferably 5 μm or more. In addition, the thickness is generally 100 mm or less, preferably 1 mm or less, more preferably 50 μm or less. When the positive collector is thinner than the above-descried range, its strength may become insufficient for the collector. On the other hand, when the positive collector is thicker than the above-descried range, there is a danger of lowering of handleability.

The positive electrode active material is not especially limited as long as the material is capable of absorption and desorption of lithium. The positive electrode active material generally used in the lithium-ion secondary cell may be utilized. Specific examples include a lithium-manganese complex oxide (e.g., $LiMn_2O_4$), a lithium-nickel complex oxide (e.g., $LiNiO_2$), a lithium-cobalt complex oxide (e.g., $LiCoO_2$), a lithium-iron complex oxide (e.g., $LiFeO_2$), a lithium-nickel-manganese complex oxide (e.g., $LiNi_{0.5}Mn_{0.5}O_2$), a lithium-nickel-cobalt complex oxide (e.g., $LiNi_{0.8}Co_{0.2}O_2$), a lithium-nickel-cobalt-manganese complex oxide, a lithium-transition metal phosphate compound ($LiFePO_4$), and a lithium-transition metal sulfate compound (e.g., $Li_xFe_2(SO_4)_3$). Among these positive electrode active materials, a lithium-nickel-cobalt-manganese complex oxide is preferred for easily exhibiting the effects of the present invention.

The positive electrode active material may be used alone or in combination. The content of the positive electrode material in the positive electrode active material layer is generally 10% by mass or more, preferably 30% by mass or more, more preferably 50% by mass or more. In general, the content is 99.9% or less, preferably 99% by mass or less. Although the binder for binding the positive electrode active material may be the same as those above-described for the negative electrode, other known binder resins may be selected and used arbitrarily. A conductive material may be included in the positive electrode active material layer for improving the conductivity of the electrode. The conductive material is not especially limited as long as the conductive material is capable of imparting conductivity by mixing in an appropriate amount, but is generally carbon powder such as acetylene black, carbon black and graphite, or a variety of metal material in the form of a fiber, a powder or a foil. The thickness of the positive electrode active material layer is generally about 10 to 200 μm.

The density (calculated from a mass and a thickness of the laminated positive electrode mixture layer per unit area of the collector) of the positive electrode active material layer is preferably 3.0 to 4.5 g/cm$^3$.

[3] Separator

In general, the separator is placed between the positive electrode and the negative electrode, thereby preventing a short circuit between the electrodes. The separator is generally a porous body such as a porous film or a non-woven fabric. A porosity of the separator is appropriately selected depending on the permeability of electrons and ions and on the material of the separator, but is preferably 30 to 80%.

As the separator, materials having excellent ion permeability, such as a microporous film, a glass fiber sheet, a non-woven fabric or a woven fabric can be used. From the standpoint of organic solvent resistance and hydrophobicity, polypropylene, polyethylene, polyphenylene sulfide, polyethylene terephthalate, polyethylene naphthalate, polymethyl pentene, polyamide or polyimide is used as the material for the separator. Such materials may be used alone or in combination. The thickness of the separator is, for example, 10 to 300 μm.

[4] Electrolyte

The electrolyte contains a solvent and an electrolyte salt dissolved therein. The solvent is, for example, one or more of non-aqueous solvents (organic solvents) described below. Examples of the non-aqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane or tetrahydrofuran. Other examples of the non-aqueous solvents include 2-methyltetrahydrofuran, tetrahydropyran, 1,3-dioxolane, 4-methyl-1,3-dioxolane, 1,3-dioxane and 1,4-dioxane. Other examples of the non-aqueous solvents include methyl acetate, ethyl acetate, methyl propionate, ethyl propionate, methyl butyrate, methyl isobutyrate, trimethyl acetate and ethyl trimethyl acetate. Other examples of the non-aqueous solvents include acetonitrile, glutaronitrile, adiponitrile, methoxy azetonitrile, 3-methoxy propionitrile, N,N-dimethyl formamide, N-methyl pyrrolidinone and N-methyl oxazolidinone. Other examples of the non-aqueous solvents include N,N'-dimethyl imidazolidinone, nitromethane, nitroethane, sulforan, trimethyl phosphate and dimethyl sulfoxide.

Among the above-mentioned solvents, preferred is at least one of ethylene carbonate, propylene carbonate, dimethyl carbonate, diethyl carbonate and ethyl methyl carbonate because dissociation of the electrolyte and ion mobility becomes improved. In this case, more preferred is a combination of a high viscosity (high dielectric constant) solvent (e.g., specific dielectric constant $\in \geq 30$) such as ethylene carbonate or propylene carbonate, and a low viscosity solvent (e.g., viscosity ≤1mPa·s) such as dimethyl carbonate, ethyl methyl carbonate or diethyl carbonate.

In particular, the solvent may be a cyclic carbonic ester having one or more unsaturated carbon bond(s) (unsaturated carbon bond cyclic carbonic ester). Upon charging and discharging, a stable protection film is formed on a surface of the negative electrode, thereby preventing decomposition reaction of the electrolyte. The unsaturated carbon bond cyclic carbonic ester is vinylene carbonate or vinylethylene carbonate, for example. The content of the unsaturated carbon bond cyclic carbonic ester in the non-aqueous solvent is from 0.01% by mass or more and 10% by mass or less, for example, because the decomposition reaction of the electrolyte is prevented without decreasing the cell capacity.

Also, the solvent may be at least one of a linear carbonic ester having one or more halogen groups (halogenated linear carbonic ester) and a cyclic carbonic ester having one or more halogen groups (halogenated cyclic carbonic ester). The use of such a solvent enables a formation of a stable protection film on a surface of the negative electrode during the charging and discharging, thereby preventing a decomposition reaction of the electrolyte. The types of the halogen group is not especially limited, but is preferably a fluorine group, a chlorine group or a bromine group, more preferably a fluorine group, because the decomposition reaction of the electrolyte is further prevented. With respect to the number of halogen groups, two is preferred over one, and it may be three or more. This is because a stronger and stable protection film is formed, and more effectively prevents the decomposition reaction of the electrolyte. Examples of the halogenated linear carbonic ester are fluoromethylmethyl carbonate, bis(fluoromethyl)carbonate and difluoromethylmethyl carbonate. Examples of the halogenated cyclic carbonic ester are 4-fluoro-1,3-dioxolan-2-on and 4,5-difluoro-1,3-dioxolan-2-on. The content of the halogenated linear carbonic ester and the halogenated aromatic carbonic ester in the non-aqueous solvent is, for example, 0.01% by mass or more and 50% by mass or less because the decomposition reaction of the electrolyte can be inhibited without decreasing the cell capacity.

Also, the solvent may be a sultone (cyclic sulfonic ester), because it improves the chemical stability of the electrolyte. The sulfone is, for example, propanesultone or propenesultone. The content of the sultone in the non-aqueous solvent is, for example, 0.5% by mass or more and 5% by mass or less because the decomposition reaction of the electrolyte can be prevented without decreasing the cell capacity.

Furthermore, the solvent may be an acid anhydride, because the chemical stability of the electrolyte can be improved further. The acid anhydride is, for example, dicarboxylic anhydride, disulfonic anhydride or carboxylic sulfonic anhydride. The dicarboxylic anhydride is, for example, succinic anhydride, glutaric anhydride or maleic anhydride. The disulfonic anhydride is, for example, ethanedisulfonic anhydride or propanedisulfonic anhydride. The carboxylic sulfonic anhydride is, for example, sulfobenzoic anhydride, propionic anhydride or sulfobutyric anhydride. The content of the acid anhydride in the non-aqueous solvent is, for example, 0.5% by mass or more and 5% by mass or less because the decomposition reaction of the electrolyte can be prevented without decreasing the cell capacity.

(Electrolyte Salt)

The electrolyte salt is any one or more of lithium salts described below. Note that the electrolyte salt may be a salt other than the lithium salt (for example, a light metal salt other than the lithium salt).

For example, the lithium salt may be the following compounds: lithium hexafluorophosphate (LiPF$_6$), tetrafluorophosphate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifuluormethanesulfonate (LiCF$_3$SO$_3$), lithium tetrachloroaluminate (LiAlCl$_4$), dilithium hexafluorosilicate (Li$_2$SiF$_6$), lithium chloride (LiCl) and lithium bromide (LiBr). Such compounds enable excellent cell capacity, cycle characteristics and storage characteristics.

Among them, at least one of lithium hexafluorophosphate, tetorafluorophosphate, lithium perchlorate and lithium hexafluoroarsenate is preferred, and lithium hexafluorophosphate is more preferred, because internal resistance can be lowered to provide a higher effect. The content of the electrolyte salt is 0.3 mol/kg or more and 3.0 mol/kg or less relative to the amount of the solvent because high ion conductivity can be obtained.

[5] Form of Lithium-ion Secondary Cell

The form of the lithium-ion secondary cell of the present invention is not especially limited. Examples of the forms of the lithium-ion secondary cell of the present invention include a cylinder type where sheet electrodes and a separator are in a spiral shape, an inside-out structure cylinder type where pellet electrodes and a separator are combined, and a coin type where pellet electrodes and a separator are laminated. Also, the cell can be formed into any arbitrary shape, such as a coin shape, a cylinder shape, a square shape or a pouch shape, by placing the cell in the above-mentioned form into an arbitrary casing.

There is no particular limitation to a procedure for assembling the lithium-ion secondary cell, and the cell can be assembled by any procedure depending on the structure of the cell. To take an example, the negative electrode is mounted on the outer casing, the electrolyte and the separator are placed thereon, the positive electrode is further mounted so as to face the negative electrode, and the resultant is caulked together with a gasket and a sealing plate, thereby providing the cell.

[6] Preferred Form of Using the Lithium-ion Secondary Cell

The initial charging of the lithium-ion secondary cell of the present invention may be started after aging the cell for 20 hours or more, preferably 24 hours or more and 48 hours or less after the production of the cell.

The aging means placing an assembled cell at a predetermined temperature for a predetermined time.

An aging time is 20 hours or more, preferably 24 hours or more and 48 hours or less. The cycle life of the cell is improved by aging for the above-mentioned time. There is no improvement in the cycle life when the aging time is less than 20 hours or more than 48 hours.

An aging temperature is 20° C. or more and 50° C. or less, preferably 20° C. or more and 40° C. or less. There is no improvement in the cycle life when the aging temperature is less than 20° C. On the other hand, when the aging temperature exceeds 50° C., contrary to the effects of aging, degradation of the cell proceeds and the cycle life of the cell may become decreased. According to the present invention, potential of the negative electrode during the aging is 0.5 V or less. When the potential of the negative electrode exceeds 0.5V, the negative electrode, especially the collector, becomes degraded during the aging, and the cycle life of the cell may become decreased. The potential of the negative electrode may be adjusted by charging the cell after the assembly thereof so that the potential of the negative electrode becomes 0.5 V or less.

EXAMPLES

The present invention is described below in detail with reference to the following Examples, but the scope of the present invention is not limited thereto. Abbreviations of the compounds used in Examples and Comparative Examples are as follows.

NMP: N-methyl-2-pyrollidone
p-PD: p-phenylene diamine
m-BP: 4,4'-bis(3-aminophenoxy)biphenyl
BPDA: 3,3',4,4'-biphenyltetracarboxylic acid dianhydride In the Examples, a variety of physical properties are measured in accordance with the following methods.

(Total Pore Volume and Average Pore Diameter)

A total pore volume and an average pore diameter of carbon particles were calculated by measuring an adsorption isotherm using the nitrogen gas adsorption method at a liquid nitrogen temperature (77K). BELSORP-max manufactured by BEL JAPAN, Inc. was used for the measurement. As a pretreatment before the measurement, vacuum heat degassing was carried out using BELPREP-vacII manufactured by BEL JAPAN, Inc.

The total pore volume was calculated from the amount of adsorption amount at a relative pressure of 0.99 in the obtained adsorption isotherm. The average pore diameter was calculated from the total pore volume and a BET specific surface area determined from the same adsorption isotherm used for determining the total pore volume.

(Average Particle Diameter ($D_{50}$))

An average particle diameter $D_{50}$ is obtained by measuring a particle diameter distribution by a laser diffraction method and calculating the particle diameter where an integrated value of a volume distribution corresponds to 50%.

(Average Fiber Diameter and Aspect Ratio)

An average fiber diameter was determined by an SEM image analysis.

An aspect ratio was calculated from the fiber diameter and a fiber length both determined by the SEM image analysis.

Example 1

<Preparation of Electrode Binder Resin Composition>

To a vessel equipped with an agitator and a nitrogen inlet tube, 32.44 g (0.3 mol) of p-PD, 36.84 g of m-BP (0.1 mol) and 532.7 g of NMP as a solvent were charged. A temperature of the resultant solution was increased to 50° C., and the solution was agitated until p-PD and m-BP were dissolved. After decreasing the temperature of the solution to room temperature, 115.33 g (0.392 mol) of BPDA was added over about 30 minutes, followed by addition of 228.3 g of NMP, and was agitated for 20 hours to obtain an electrode binder resin composition A. The thus obtained electrode binder resin composition had a solids concentration of 18% by mass and a logarithmic viscosity of 0.89 dl/g.

<Production of Negative Electrode>

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (MAGD-20 manufactured by Hitachi Chemical Co., Ltd.), and NMP, followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere, thereby producing a negative electrode. The mass of the negative electrode mixture per unit area after drying was 4.4 mg/cm$^2$.

<Production of Positive Electrode>

To 93 parts by mass of LiCo$_{1/3}$Ni$_{1/3}$Mn$_{1/3}$O$_2$ was added and mixed 3 parts by mass of a solution obtained by dissolving vinylidene polyfluoride in N-methyl-2-pyrrolidone and 4 parts by mass of the conductive additive (DENKA BLACK manufactured by Denka Company Limited.), followed by kneading using a compound agitator for a cell (T.K. HIVI MIX Model 2P-03 manufactured by PRIMIX Corporation), thereby obtaining a positive electrode mixture paste. The paste was uniformly applied on an aluminum foil having a thickness of 20 μm so that the mass of the positive electrode mixture per unit area becomes 19 mg/cm$^2$ after drying. The paste was dried to form a positive electrode mixture layer and was subjected to pressing at normal temperature using a roller pressing machine to thereby obtain a positive electrode.

<Production of Cell>

For evaluating the cell properties of a cell having the above-mentioned negative electrode, a coin cell was produced. The negative electrode having a diameter of 14.5 mmΦ and the positive electrode having a diameter of 13 mmΦ were used as the electrodes. A mixed solvent of ethylene carbonate and methyl ethyl carbonate (mixed in a volume ratio of 3:7) into which LiPF$_6$ was dissolved at a concentration of 1 mol/l was used as the electrolyte, and a polypropylene porous film having a diameter of 16 mmΦ and a film thickness of 25 μm was used as a separator.

<Evaluation of Cell>

The cell was allowed to stand at 25° C. for 24 hours, and was then charged to 4.2V at 0.05 C at a measurement temperature of 25° C. Then, an initial charge capacity (unit: mAh/g) was calculated from a time taken to discharge to 2.3 V at 0.05 C and the mass of the negative electrode active material. In second and preceding cycles, the cell was charged to 4.2 V at 1 C, and discharged to 0.05 C at a constant voltage of 4.2 V. Thereafter, the discharge capacity in each of the second and the preceding cycles was calculated from a time taken to discharge to 2.3 V at 1 C and a mass of the negative electrode active material. Charging and discharging were carried out repeatedly under the above conditions. A discharge capacity maintenance factor at 100th cycle was calculated by the following (Equation 1).

[Equation 1]

$$\text{Discharge capacity maintenance factor (\%)} = \frac{\text{Discharge capacity after 100 cycles}}{\text{Discharge capacity after 2 cycles}} \times 100 \quad \text{(Equation 1)}$$

At 101st cycle, the cell was charged to 4.2V at 0.05 C. Then, the cell was discharged to 2.3V at 0.05 C. Aa load characteristic was calculated by the following Equation 2.

[Equation 2]

$$\text{Load characteristic (\%)} = \frac{\text{Discharge capacity at 100th cycle (current density: 1 C)}}{\text{Discharge capacity at 101st cycle (current density: 0.05 C)}} \times 100 \quad \text{(Equation 2)}$$

The results are shown in Table 1.

Example 2

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (SMG-N-HP1-10 manufactured by Hitachi Chemical Co., Ltd.), followed by further kneaded to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere, thereby producing a negative electrode. The mass of the negative electrode mixture per unit area after drying was 4.4 mg/cm$^2$. Using the produced negative electrode, a coin cell was produced in the same manner as Example 1 and the cell properties were evaluated. The results are shown in Table 1.

Example 3

The cell produced in Example 1 was allowed to stand at 25° C. for 12 hours. Then, the cell properties were evaluated in the same manner as Example 1. The results are shown in Table 1.

Example 4

The electrode binder resin composition A containing 10 parts by weight of polyimide and 3 parts by mass of a conductive additive (DENKA BLACK manufactured by Denka Company Limited.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (MAGD-20 manufactured by Hitachi Chemical Co., Ltd.), followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere, thereby producing a negative electrode. Using the produced negative electrode, a coin cell was produced in the same manner as Example 1 and the cell properties were evaluated. The results are shown in Table 1.

Example 5

The electrode binder resin composition A containing 10 parts by weight of polyimide and 3 parts by mass of a conductive additive (Ketchen Black manufactured by Lion Specialty Chemicals Co.,) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (MAGD-20 manufactured by Hitachi Chemical Co., Ltd.), followed by further kneading to obtain a negative electrode mixture paste. A mass ratio of the silicon oxide as the active material to the carbon particles was 30:70.

Using an applicator, the thus prepared electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere, thereby producing a negative electrode. Using the produced negative electrode, a coin cell was produced in the same manner as Example 1 and the cell properties were evaluated. The results are shown in Table 1.

Example 6

To the electrode binder resin composition A containing 10 parts by weight of polyimide were added a total of 87 parts by mass of a silicon oxide coated with a carbon coating (KSC-1064 having an average particle diameter of 5 μm manufactured by Shin-Etsu Chemical Co., Ltd.) and carbon particles (MAGD-20 manufactured by Hitachi Chemical Co., Ltd.), followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector using an applicator and was cured by subjecting to a heat treatment at 350° C. for 10 minutes under nitrogen atmosphere, thereby producing a negative electrode. Using the produced negative electrode, a coin cell was produced in the same manner as Example 1 and the cell properties were evaluated. The results are shown in Table 1.

Example 7

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste was added a total of 87 parts by mass of a silicon oxide coated with a carbon coating (KSC-1059 having an average particle diameter of 5 μm manufactured by Shin-Etsu Chemical Co., Ltd.) and carbon particles (MAGD-20 manufactured by Hitachi Chemical Co., Ltd.), followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere to produce a negative electrode. The mass of the negative electrode mixture after drying was 4.4 mg/cm$^2$. Using the produced negative electrode, a coin cell was produced in the same manner as Example 1 and the cell properties were evaluated. The results are shown in Table 1.

Example 8

The electrode binder resin composition A containing 10 parts by weight of polyimide and 3 parts by mass of a conductive additive (DENKA BLACK manufactured by Denka Company Limited.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (SMG-N-HP1-10 manufactured by Hitachi Chemical Co., Ltd.), followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was cured by subjecting to a heat treatment at 350° C. for 10 minutes under nitrogen atmosphere to produce a negative electrode. The mass of the negative electrode mixture after drying was 4.4 mg/cm$^2$. Using the produced negative electrode, a coin cell was produced in the same manner as Example 1 and the cell properties were evaluated. The results are shown in Table 1.

Comparative Example 1

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (SMGP manufactured by China Steel Chemical Corporation), followed by further kneading to obtain a negative electrode mixture paste. A mass ratio of the silicon oxide as the active material to the carbon particles was 30:70.

Using an applicator, the thus obtained electrode paste was applied on a copper foil (a rolled copper foil having a thickness of 18 μm manufactured by Nippon Foil Mfg. Co., Ltd.) as the collector and was subjected to a heat treatment at 350° C. for 10 minutes under nitrogen atmosphere to produce a negative electrode. The mass of the negative electrode mixture after drying was 4.4 mg/cm². Using the produced negative electrode, a coin cell was produced in the same manner as Example 1 and the cell properties were evaluated. The results are shown in Table 1.

Comparative Example 2

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste were added a total of 87 parts by mass of a silicon oxide coated with a carbon coating (KSC-1064 having an average particle diameter of 5 μm manufactured by Shin-Etsu Chemical Co., Ltd.) and carbon particles (hard carbon manufactured by Sumitomo Bakelite Co., Ltd.), followed by further kneading to obtain a negative electrode mixture paste. A mass ratio of the silicon oxide as the active material to the carbon particles was 30:70.

Using an applicator, the thus obtained electrode paste was applied to a copper foil (a rolled copper foil having a thickness of 18 μm manufactured by Nippon Foil Mfg. Co., Ltd.) as the collector using an applicator and cured by a heat treatment at 350° C. for 10 minutes under nitrogen atmosphere to produce a negative electrode. The mass of the negative electrode mixture after drying was 4.4 mg/cm². Using the produced negative electrode, a coin cell was produced in the same manner as Example 1 and the cell properties were evaluated. The results are shown in Table 1.

Comparative Example 3

The electrode binder resin composition A containing 10 parts by weight of polyimide and 3 parts by mass of a conductive additive (VGCF-H manufactured by SHOWA DENKO K.K.) were kneaded using a compound agitator for a cell (T.K. HIVI MIX Model 2P-03 manufactured by PRIMIX Corporation). To the resultant paste were added a total of 87 parts by mass of a silicon oxide not coated with a carbon coating (silicon monoxide having an average particle diameter of 10 μm manufactured by Sigma-Aldrich Co., LLC.) and carbon particles (MAGD-20 manufactured by Hitachi Chemical Co., Ltd.), followed by further kneading to obtain a negative electrode mixture paste. A mass ratio of the silicon oxide as the active material to the carbon particles was 30:70.

Using an applicator, the thus obtained electrode paste was applied to a copper foil (a rolled copper foil having a thickness of 18 μm manufactured by Nippon Foil Mfg. Co., Ltd.) as the collector using an applicator and cured by a heat treatment at 350° C. for 10 minutes under nitrogen atmosphere to produce a negative electrode. The mass of the negative electrode mixture after drying was 4.4 mg/cm². Using the produced negative electrode, a coin cell was produced in the same manner as Example 1 and the cell properties were evaluated. The results are shown in Table 1.

TABLE 1

|  | Unit | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|
| (A) Alloy-Based Material | — | SiO-1 | SiO-1 | SiO-1 | SiO-1 | SiO-1 | SiO-1 | SiO-2 | SiO-1 | SiO-1 | SiO-1 | SiO-3 |
| Average Particle Diameter ($D_{50}$) |  | 5 | 5 | 5 | 5 | 5 | 5 | 5 | 5 | 5 | 5 | 10 |
| (C) Carbon Coating |  | Present | Present | Present | Present | Present | Present | Present | Present | Present | Present | Not Present |
| (C)/(A + C) Weight Ratio |  | 5 | 5 | 5 | 5 | 5 | 5 | 2.5 | 5 | 5 | 5 | 0 |
| (B) Carbon Particles | — | MAGD | SMG | MAGD | MAGD | MAGD | MAGD | MAGD | SMG | MSMB | HC | MAGD |
| Average Particle Diameter $D_{50}$ |  | 20 | 10 | 20 | 20 | 20 | 20 | 20 | 10 | 9 | 10 | 20 |
| Total Pore Volume | cm³/g | 3E−02 | 2E−02 | 3E−02 | 3E−02 | 3E−02 | 3E−02 | 3E−02 | 2E−02 | 9E−03 | 9E−03 | 3E−02 |
| Average Pore Diameter | nm | 29 | 36 | 29 | 29 | 29 | 29 | 29 | 36 | 26 | 13 | 29 |
| (C') Conduction Supporting Agent | — | VGCF | VGCF | VGCF | AB | KB | — | VGCF | AB | VGCF | VGCF | VGCF |
| Fiber Diameter | nm | 150 | 150 | 150 | 35 | 40 | — | 150 | 35 | 150 | 150 | 150 |
| Aspect Ratio | — | ≥10 | ≥10 | ≥10 | <3 | <3 | — | ≥10 | <3 | ≥10 | ≥10 | ≥10 |
| (D) Binder | — | PI | PI | PI | PI | PI | PI | PI | PI | PI | PI | PI |
| $D_{50}(B)/D_{50}(A)$ | — | 4.0 | 2.0 | 4.0 | 4.0 | 4.0 | 4.0 | 4.0 | 2.0 | 1.8 | 2.0 | 2.0 |
| (A)/(A + B) Weight Ratio | wt % | 30 | 30 | 30 | 30 | 30 | 30 | 30 | 30 | 30 | 30 | 30 |
| Aging Time | Time | 24 | 24 | 12 | 24 | 24 | 24 | 24 | 24 | 24 | 24 | 24 |
| Load Capacity (%) | % | 92 | 85 | 92 | 92 | 94 | 92 | 87 | 81 | 68 | 70 | 78 |
| First Discharge Capacity | mAh/g | 566 | 552 | 561 | 616 | 554 | 587 | 553 | 524 | 510 | 552 | 630 |
| Discharge Capacity Maintenance Factor (After 100 Cycles) | % | 85 | 77 | 81 | 81 | 80 | 81 | 73 | 74 | 35 | 52 | 52 |

(Meaning Of Abbreviations in Table)
SiO-1: Manufactured by Shin-Etsu Chemical Co., Ltd., KSC-1064
SiO-2: Manufactured by Shin-Etsu Chemical Co., Ltd., KSC-1059
SiO-3: Manufactured by Sigma-Aldrich Co., Llc., Silicon Monoxide
MAGD: Manufactured by Hitachi Chemical Co., Ltd., MAGD-20
SMG: Manufactured by Hitachi Chemical Co., Ltd., SMG-N-HP1-10
MCMB: Manufactured by China Steel Chemical, SMGP
HC: Manufactured by Sumitomo Bakelite Co., Ltd., Hard Carbon
VGCF: Manufactured by SHOWA DENKO K.K., VGCF-H
AB: Manufactured by Denka Company Limited., DENKA BLACK
KB: Manufactured by Lion Specialty Chemicals Co., Ketchen Black
PI: Polyimide Precursor (Polyamide Acid)

Each of Examples 1 to 8 was a lithium-ion secondary cell having high capacity. Examples 1 to 8 using the alloy-based material (A) coated with the carbon coating (C) and the carbon particles (B) having the total pore volume of $1.0\times10^{-2}$ to $1.0\times10^{-1}$ cm$^3$/g and the average pore diameter of 20 to 50 nm had a discharge capacity maintenance factor and a load characteristic at 100th cycle which are higher than those of Comparative Examples 1 and 2 which did not use the above-described carbon particles (B). Further, the load characteristics of Examples 1 and 2 were higher than that of Comparative Example 3 which used the alloy-based material (A) not coated with the carbon coating (C).

This application is a U.S. national stage application of International Patent Application No. PCT/JP2015/000445, filed Feb. 2, 2015, which claims the benefit of priority to Japanese Patent Application Nos. 2014-019093 and 2014-019094, both filed on Feb. 4, 2014, the entire contents of which including the specifications are incorporated herein by reference.

The invention claimed is:

1. A negative electrode for a lithium-ion secondary cell, comprising a laminate of a negative electrode active material layer and a collector, the negative electrode active material layer containing an alloy-based material (A) which contains silicon or tin as a constituent element, a carbon coating (C) that covers a surface of the alloy-based material (A), carbon particles (B), and a binder (D), wherein the carbon particles (B) have a total pore volume of $1.0\times10^{-2}$ to $1.0\times10^{-1}$ cm$^3$/g and an average pore diameter of 20 to 50 nm, both measured by nitrogen gas adsorption method, and, an average particle diameter $D_{50}$ (B) of the carbon particles (B) is 2.0 to 8.0 times greater than an average particle diameter $D_{50}$ (A) of the alloy-based material (A).

2. The negative electrode for a lithium-ion secondary cell according to claim 1, wherein a percentage of the carbon coating (C) is 3 to 20% by mass based on 100% by mass of a total of the alloy-based material (A) and the carbon coating (C) in the negative electrode active material layer.

3. The negative electrode for a lithium-ion secondary cell according to claim 1, wherein the alloy-based material (A) is silicon oxide represented by SiO$_x$ ($0.5 \leq x \leq 1.5$).

4. The negative electrode for a lithium-ion secondary cell according to claim 1, wherein a content of the alloy-based material (A) is 10 to 60% by mass based on 100% by mass of a total of the alloy-based material (A) and the carbon particles (B) in the negative electrode active material layer.

5. The negative electrode for a lithium-ion secondary cell according to claim 1, wherein flat graphite materials in the carbon particles (B) are aggregated or bonded.

6. The negative electrode for a lithium-ion secondary cell according to claim 1, wherein the binder (D) is polyimide or polyamideimide.

7. The negative electrode for a lithium-ion secondary cell according to claim 1, further comprising a conductive additive (C').

8. The negative electrode for a lithium-ion secondary cell according to claim 7, wherein the conductive additive (C') contains carbon fiber having an aspect ratio of 10 to 1000.

9. The negative electrode for a lithium-ion secondary cell according to claim 8, wherein the carbon fiber has a fiber diameter of 2 to 1000 nm.

10. The negative electrode for a lithium-ion secondary cell according to claim 8, wherein the carbon fiber is vapor grown carbon fiber.

11. A lithium-ion secondary cell including the negative electrode for a lithium-ion secondary cell according to claim 1.

12. A negative electrode mixture paste for a lithium-ion secondary cell, comprising an alloy-based material (A) containing silicon or tin as a constituent element, a carbon coating (C) that covers a surface of the alloy-based material (A), carbon particles (B), a binder material (D') and a solvent (E), wherein the carbon particles (B) have a total pore volume of $1.0\times10^{-2}$ to $1.0\times10^{-1}$ cm$^3$/g and an average pore diameter of 20 to 50 nm, both measured by nitrogen gas adsorption method, and an average particle diameter $D_{50}$ (B) of the carbon particles (B) is 2.0 to 8.0 times greater than an average particle diameter $D^{50}$ (A) of the alloy-based material (A).

13. The negative electrode mixture paste for a lithium-ion secondary cell according to claim 12, wherein the binder material (D') is at least one member selected from the group consisting of polyimides, polyimide precursors and polyamideimides, and the solvent (E) is N-methyl-2-pyrollidone or N,N-diethylacetamide.

14. A method for manufacturing a negative electrode for lithium-ion secondary cell which comprises applying and drying a negative electrode mixture paste for a lithium-ion secondary cell on a collector, wherein the negative electrode mixture paste for a lithium-ion secondary cell contains an alloy-based material (A) containing silicon or tin as a constituent element, a carbon coating (C) that covers a surface of the alloy-based material (A), carbon particles (B), a binder material (D') and a solvent (E), and the carbon particles (B) have a total pore volume of $1.0\times10^{-2}$ to $1.0\times10^{-1}$ cm$^3$/g and an average pore diameter of 20 to 50 nm, both measured by nitrogen gas adsorption method, and, an average particle diameter $D_{50}$ (B) of the carbon particles (B) is 2.0 to 8.0 times greater than an average particle diameter $D_{50}$ (A) of the alloy-based material (A).

* * * * *